Oct. 14, 1969   S. COMISAC   3,472,548
HEATED DUMP TRUCK BODY
Filed March 4, 1968   4 Sheets-Sheet 4

INVENTOR
STEVE COMISAC
BY
ATTORNEYS

United States Patent Office 3,472,548
Patented Oct. 14, 1969

3,472,548
HEATED DUMP TRUCK BODY
Steve Comisac, Box 66, Cressona, Pa. 17929
Filed Mar. 4, 1968, Ser. No. 710,158
Int. Cl. B60p 3/00; B60j 11/00
U.S. Cl. 296—28               9 Claims

ABSTRACT OF THE DISCLOSURE

A dump truck body is heated by circulating engine exhaust through passages formed mainly by tubular structural members extending across and under the bottom of the truck bed, upwardly outside the side walls, along the top and bottom edges of the truck side walls, and within the tailgate, with the exhaust exiting from openings in the tubular members along top sides of the body and in the tailgate. The heated body is provided with a rollable metal cover slidable along channels which are pivoted to the top side walls, the cover containing heat within the truck body. The body is formed of aluminum and made in sections for knock-down purposes. The tubular structural members prevent the bed from warping and the bottom from becoming depressed, while the hot exhaust passing through these members maintains a uniform temperature without hot or cold spots inside the body and provides a self cleaning effect. A pivoted tailgate is provided which does not jam if it contacts other equipment or materials when the contents of the truck are dumped. A tailgate latching arrangement utilizes a dropping hook and is operated from the front of the truck body.

BACKGROUND OF THE INVENTION

Field of the invention

This invention relates to improvements in exhaust heated dump truck bodies.

Prior art

It is generally known in the prior art to utilize engine exhaust for heating the body of a dump truck, see for example the patent to Ferwerda, 1,942,207, granted 1934. However, such prior known constructions for heating dump truck bodies have never been commercially successful and until the present invention have never been approved or extensively used for hauling any hot materials such as hot bituminous paving materials. The prior art constructions also presented structural problems since they were not built with enough strength to prevent warping, or enough heat carrying and exhaust distributing capacity to keep the body contents uniformly warm. Furthermore, bituminous paving materials have never been successfully hauled previously in heated truck bodies since the heat would escape too rapidly from the top of the open dump truck body. Uniformity of heating the material in the truck body and keeping the materials warm has been a significant problem which prevented commercial use of the known prior exhaust heated dump truck body constructions.

It has also been known to attempt to have hot bituminous paving materials in conventional dump truck bodies. However, the hot bituminous materials must be delivered to a job site at a specified temperature, and it is extremely difficult to maintain this temperature in cold weather. Previously, it has been the practice to line conventional dump truck bodies with plywood to prevent the materials from sticking to the truck body and to conserve heat. It has also been necessary to manually reheat the bituminous materials delivered to the job site by a torch man. In an attempt to conserve heat, it is known to cover a hot bituminous load with a removable canvas cover. All these cumbersome and clumsy operations are still in practice even though heated dump truck bodies were previously known generally. This just shows how unsuccessful the heated dump truck bodies of the prior art were.

SUMMARY OF THE INVENTION

This invention solves the problems existent in the prior art by providing a dump truck body heated by circulating engine exhaust in which the exhaust is passed through hollow passages formed mainly by tubular structural members extending along the top and bottom of side walls, upwardly of the side walls and across beneath the bed bottom. The hollow passages establish a path of fluid communication for the exhaust to circulate through additional tubular members in the tailgate. The engine exhaust passes out through openings in the top of the side rails and the end of the tailgate. A rollable metal cover is provided to close the top of the heated body to keep the heat within the body and help make the dump truck body suitable for hauling hot bituminous materials. The body and tubular members are all of aluminum making a lightweight body that in effect increases a given truck's capacity by about 10%. The body may be constructed in sections for knocked-down assembly. When used with hot bituminous materials, the materials are commonly dumped into a paving machine and the tailgate of the truck has an intermediate horizontal pivot to prevent the truck from jamming the tailgate on dumping the bituminous materials. The tailgate is latched by lever operated free falling side latch hooks easily operable from the front of the truck. Exhaust is passed into the truck body from rigid exhaust pipes on the truck bed cooperating with tapered female fittings on the bottom of the truck body, thus eliminating the need for troublesome flexible connections.

With the arrangements of exhaust passages, the truck body is self-cleaning, which is especially important with bituminous materials. Furthermore, the hot mix can be maintained within about 4° F. of plant temperatures. The heat is uniform and there are no hot spots and no cold spots and the temperature may be maintained at an even heat between 350° and 500° F.

When hauling hot bituminous mix in cold weather, it is not necessary to line the truck with plywood, thus saving extensive time and effort, and preventing trouble with highway inspectors since the bituminous hot mix is retained at plant temperature because with the metal cover in place the net heat loss is negligible. Even though there is no substantial heat loss, there is also no cooking of the material, that is, the existing heat of the hot bituminous mix is sustained. Delivering hot mix saves having a torch man at a paving site in chilly weather since the mix is delivered warm.

The metal cover is much improved over the prior art canvas, since it can always cover the load, has an extensive life, and has made covering and uncovering the load a simple one-step manual operation, rather than a wrestling match with a grimy canvas.

BRIEF DESCRIPTION OF THE DRAWINGS

The invention will be described in connection with the accompanying drawings in which:

FIGURE 9 is a detail view in side elevation of the roll cover cable and pulley operator arrangement.

DESCRIPTION OF PREFERRED EMBODIMENTS

Figure 6:
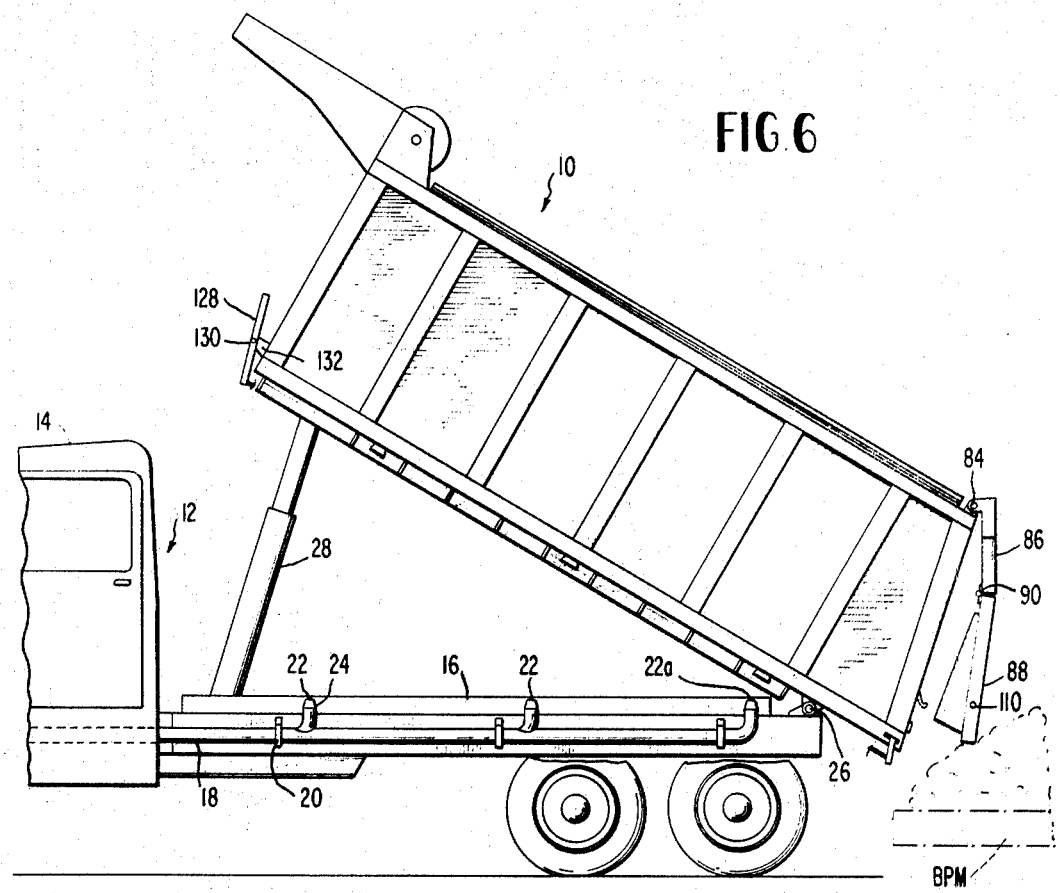
FIGURE 6 is a side elevation view of the truck body mounted on a truck showing the operation of the pivoted tailgate and the position of the body during a dumping operation.

As shown in the accompanying drawings, a dump truck body 10 is carried in the usual manner from a truck 12, see FIGURE 6. The truck 12 is of conventional type, including a cab 14, and a rearwardly extending bed 16. The truck engine has the usual exhaust system with exhaust pipes 18 extending rearwardly along the truck bed 16 and secured thereto by brackets 20, see FIGURES 2, 3 and 6.

Figure 3:
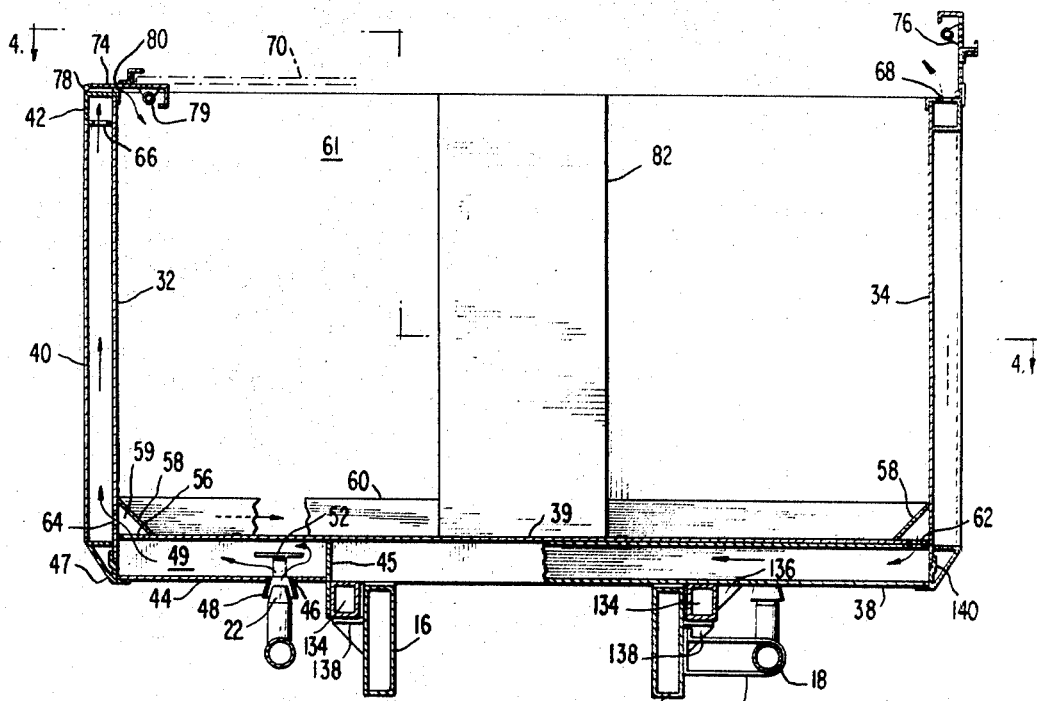
FIGURE 3 is a transverse sectional view taken along line 3—3 of FIGURE 2.

The exhaust pipes may extend along each side of the truck bed as shown in FIGURE 3 and terminate in a number of upstanding exhaust outlets 22 having inwardly tapering ends 24.

The bed is provided with a pivot 26 connected to the truck dump body so that the body may pivot while dumping, and a front mounted telescopic hoist 28 of the conventional type is provided to power the dumping.

The aluminum dump truck body is formed of a special construction to enable circulation of the engine exhaust for temperature control, and to provide structural strength. The body includes a bed 30, side walls 32 and 34, and a tailgate 36. A plurality of extruded tubular aluminum cross sills 38 are beneath the floor 39 of the bed 30. The side walls 32 and 34 are identical and each includes a plurality of extruded aluminum upright tubular box members 40 abutting into longitudinally extending top rails 42 also hollow and of tubular box section extruded aluminum.

Figure 2:
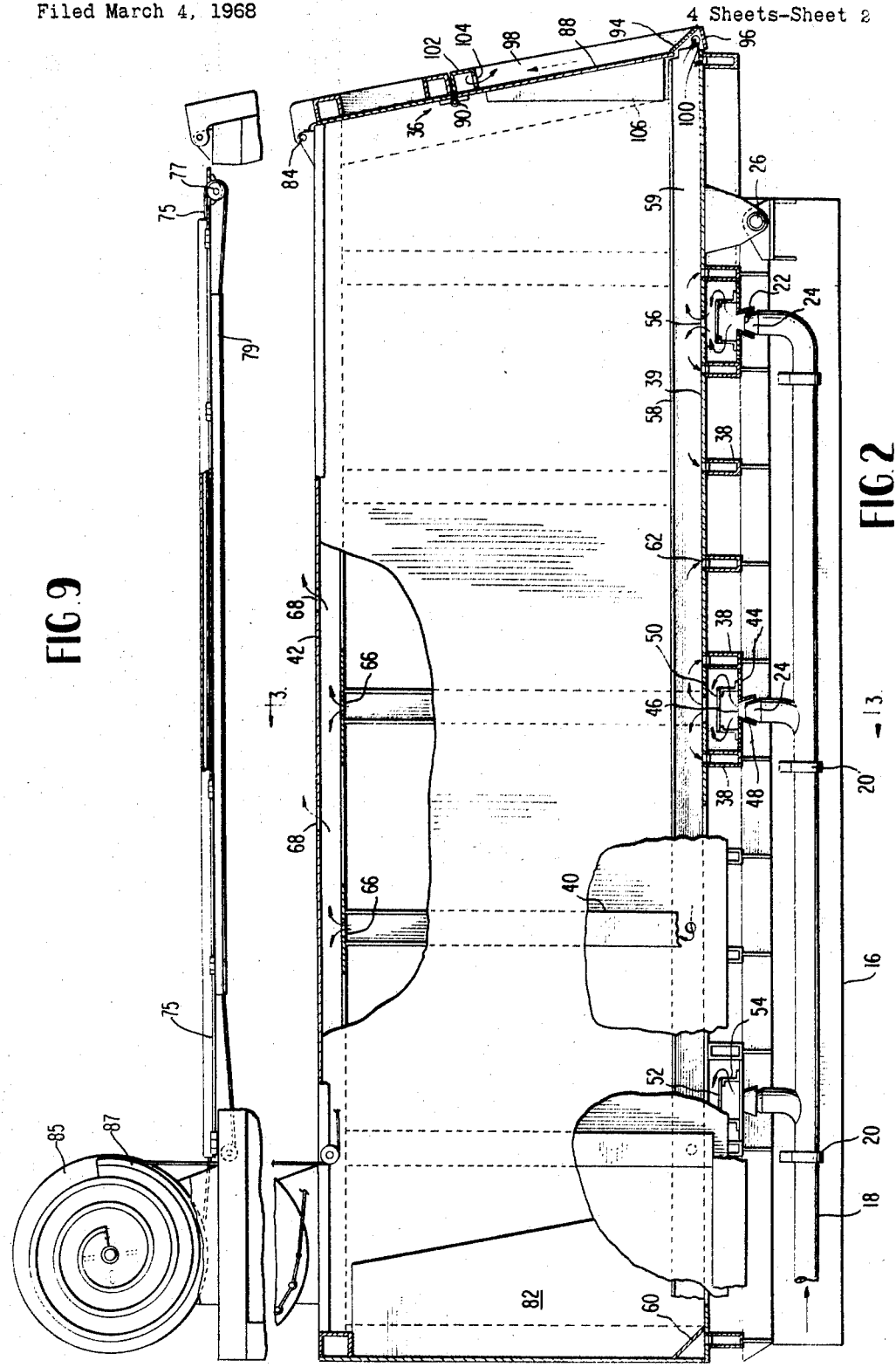
FIGURE 2 is a longitudinal sectional elevation view of the heated truck body of this invention with portions broken away for the sake of clarity.
Figure 4:
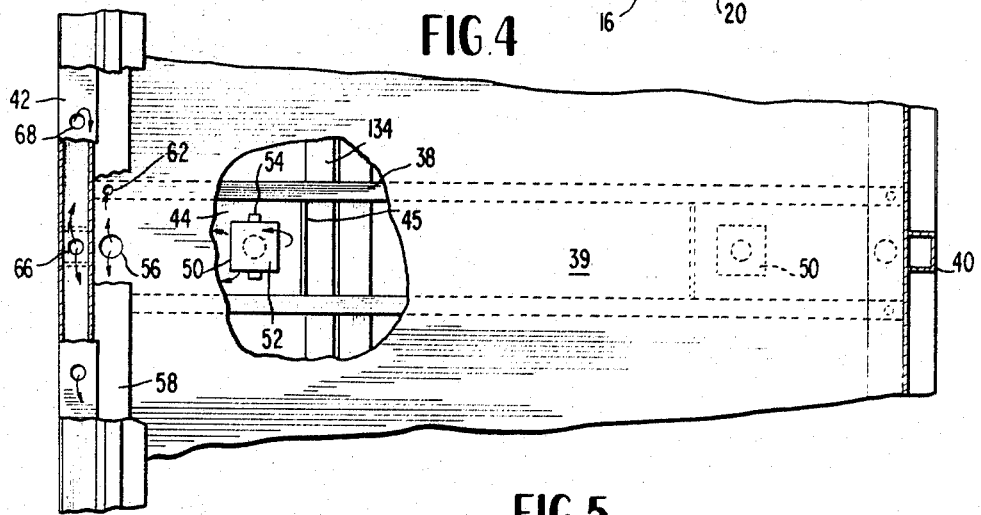
FIGURE 4 is an additional sectional view taken along line 4—4 of FIGURE 3 with additional portions broken away for the sake of clarity.

On each side of the truck between adjacent cross sills 38 in the area where exhaust outlets 22 are positioned, there are plenum plates 44, see FIGURES 2, 3 and 4. These plenum plates together with members 45, the cross sills and the sides as well as extruded aluminum longitudinal sills 47, define plenum chambers 49 for the entrance of the engine exhaust above each exhaust outlet 22. The plenum plates have a bottom opening 46 therein surrounded by a tapered skirt 48. Above the opening 46 there is an exhaust deflector 50 constructed of a plate 52 mounted on legs 54 upstanding from the plenum plate 44. This deflector plate assures that the hot exhaust from the exhaust opening 22 does not directly impinge on the truck floor 39 and create a hot spot.

As shown in FIGURE 4, there is a hole 56 through bed 59 in the area of the plenum chamber 49 and at the side edge of the bed. A pair of longitudinal aluminum gusset members 58 are positioned with one edge on the floor 39 of the bed and the other longitudinal edge on a side wall 32 or 34 as shown in FIGURES 3 and 4, and thus creates a longitudinal passage 59 above holes 56 for the passage of the exhaust for heating purposes. Another gusset member 60 may extend across the front end 61 of the truck, see FIGURE 3. From passage 59, the exhaust flows beneath the bed through the hollow box sills 38, entering through opening 62 in the floor and in the sill, see FIGURES 3 and 4. Some of the exhaust may also go through openings 64 in the box tubular upright side members 40, see FIGURE 3. The hot exhaust passing across sills 38 and up structural members 40 tends to heat the truck body. At the top of the upright members 40 there is a hole 66 in the bottom tubular top rails 42. The exhaust can thus pass longitudinally down the top side rails 42 until it reaches exhaust openings 68, see FIGURES 2 and 3.

The movement of hot exhaust gas through these passages causes heat transfer to the aluminum body and evenly heats the material carried by the body, while the aluminum box sections contribute significant strength to the bed and sides of the body. To retain the heat within the body there is provided a metal roll cover 70 of aluminum link panel or the like on a roll frame 72 secured to the top of the truck body, see FIGURE 1. The cover when unrolled is guided by extruded aluminum guide channels 74 and 76 which are pivoted by hinges 78 to the top sides of the truck body. Leveling members 80 assure that each track is level as shown in the left-hand top portion of FIGURE 3 when the channels are functioning as tracks. The channels may be pivoted upright as shown in the right-hand top portion of FIGURE 3 and the hinge limits the pivotal movement to 90° so that in this position, the channels form side boards or upright extensions of the entire sides of the truck. Cables 75 detachably secured to the front ends of the roll cover are trained around pulleys 77 back through protective tube 19 to be operated by a removable crank on shaft 81 to roll or unroll the cover. The cables are disconnected when the channels are pivoted to an upright position. A powered mechanical drive may be provided to operate the roll cover. The cables are wound on a hub 85 having spiral grooves 87 equivalent to the wound metal roll cover 70 to allow easy operation.

A well 82, see FIGURES 2 and 3, of conventional construction is provided in the front end center of the truck body to house the hoist 28. A conventional canopy 83 may also be provided.

Figure 1:
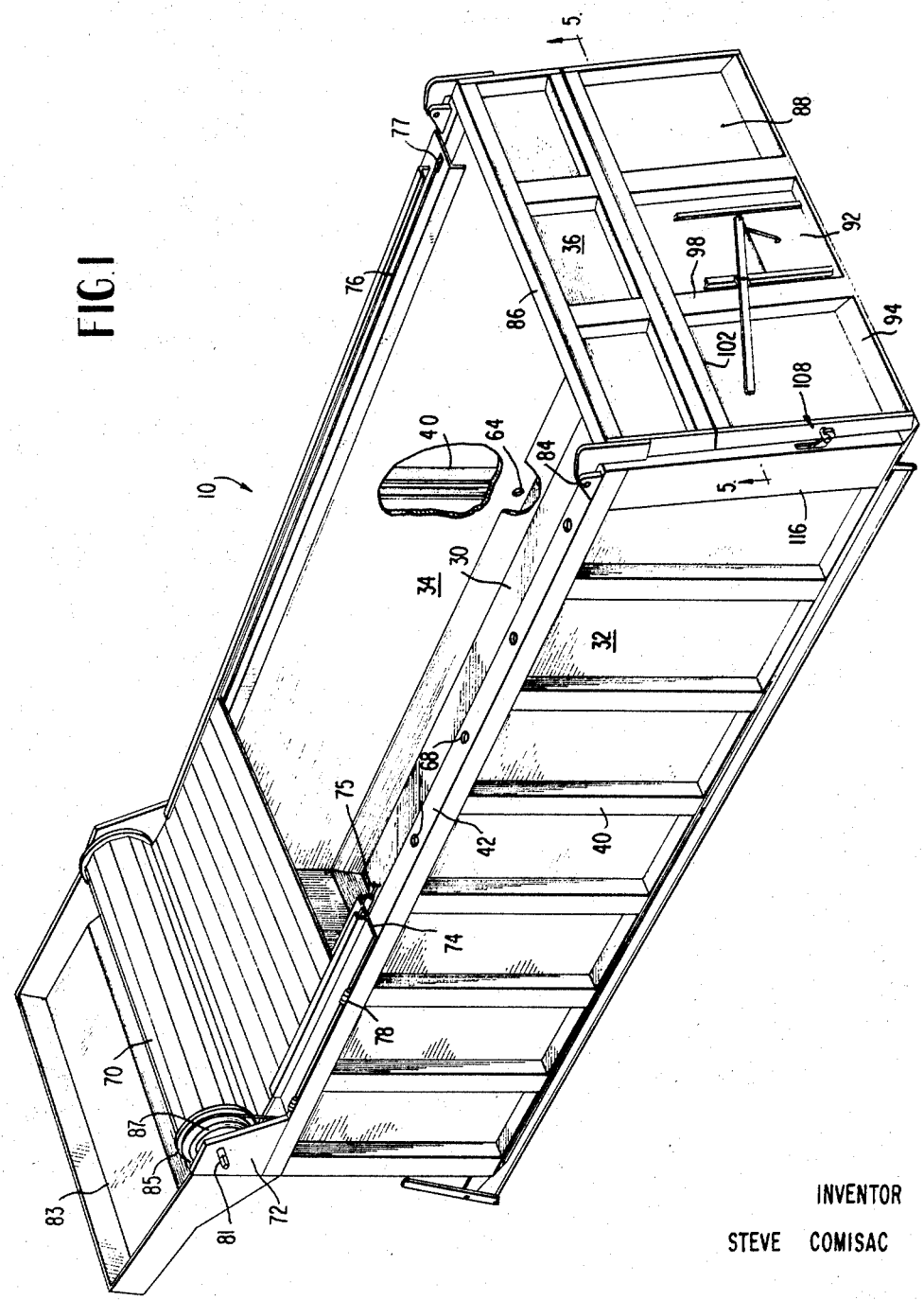
FIGURE 1 is a perspective view of the heated truck body of this invention with portions broken away for the sake of clarity.

The tailgate 36 is provided with a conventional upper tailgate pivot 84. The tailgate, however, is preferably divided into two sections, an upper tailgate section 86 and a lower tailgate section 88, which are pivoted to each other at an intermediate horizontal pivot point by hinge 90. The upper section 88 is formed from extruded aluminum box sections, bars and sheets as shown in FIGURES 1 and 2, but does not carry any exhaust in the preferred embodiment. The tailgate could, however, be rigid and the entire tailgate could carry exhaust.

Figure 5:
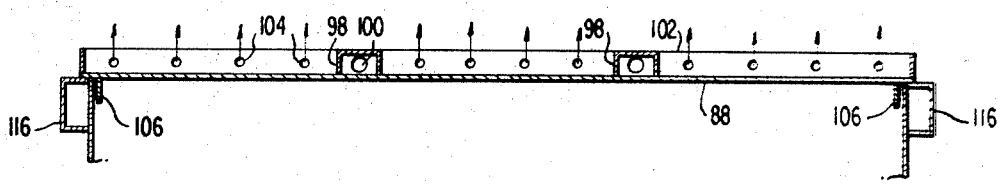
FIGURE 5 is a sectional view taken along line 5—5 of FIGURE 1.

In the preferred embodiment, the lower tailgate section 88 is provided with a conventional door control chute 90. This lower section has internal passages for the exhaust to accomplish its heating function. These passages are formed by a cross member 94 and a bottom 96 cooperating with the inside panel 88 defining a horizontal passage in fluid communication with the longitudinal passages 59, which extend rearwardly as shown in FIGURE 2 into the tailgate section. Openings 100 into upright box channels 98 of extruded aluminum allow passage of the exhaust gases. The exhaust gases are distributed horizontally at the top of box channel 98 by horizontal tubular member 102 which is also a box channel of rectangular cross section. The exhaust exists from a number of exhaust openings 104 in the bottom of channel 102, see FIGURES 2 and 5.

The inside of lower section 88 has deflection members 106 to prevent side spillage of the contents of the truck body when it is first being dumped.

Figures 7, 8:
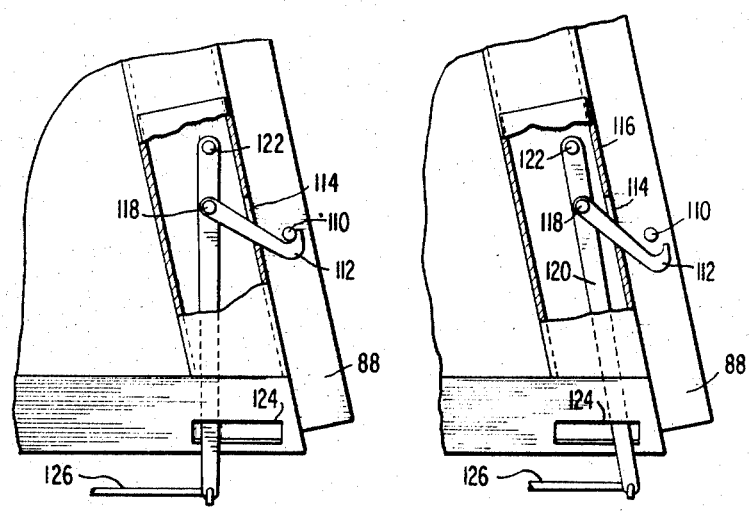
FIGURE 7 is a detail view of the latching arrangement for the tailgate in latched condition.
FIGURE 8 is a detail view similar to FIGURE 7 in an unlatched condition.

The tailgate is latched by a unique latch construction 108 which includes a keeper pin 110 extending transversely from the lower tailgate section 88 and cooperating with a pivoted hook 112, see FIGURES 7 and 8. Pivoted hook 112 extends through an opening 114 in rear box channel 116 of the truck side and is pivoted at 118 to lever 120 which in turn is pivoted at 122 to the truck body and extends downwardly through an opening 124. A link 126 attached to lever 120 extends to the front of the truck where it is connected to a handle lever 128 pivoted at 130 to a bracket 132, see FIGURE 6. When the handle 128 is pulled forward, the link 126 moves from the FIGURE 7 to the FIGURE 8 position pivoting lever 120 which changes the relative position of pivot 118 and the bottom of opening 114 allowing hook 112 to fall downwardly and release the keeper pin 110. At this time, the tailgate may swing loose about its upper pivot 84 and the contents of the truck may be dumped as shown in FIGURE 6.

If upon dumping of the truck a machine, such as a bituminous paving machine BPM FIGURE 6, or a pile of material or other obstruction is contacted by the tailgate, it will not jam the tailgate or prevent the contents of the truck from being dumped, as would be the case of a tailgate without an intermediate point. Rather, the tailgate will pivot about its intermediate hinge 90 as shown in FIGURE 6.

The truck body 10 is built on a subframe, including longitudinals 134 and gussets 136. This subframe carries the cross sills 38, bed 30 and longitudinal channels 47. The longitudinals rest on seats 138 of the truck bed 16. The sides and front and tailgate of the truck dump body may be constructed separately and shipped knocked down and assembled by inserting the sides into the joint 140 created by the extruded channel members 47, welding, and attaching the gusset members 58.

The operation of the truck body of the invention is believed to be evident from the foregoing description, but a brief summary will now be given. The truck body 10 is particularly suitable for holding hot mix bituminous paving material, even during cold weather, to insure the material is delivered to the site of construction at correct laying temperature. In fact, this is the only heated truck body which has received the specific written approval of the Commonwealth of Pennsylvania, Department of Highways for this type of work. Engine exhaust from exhaust pipe 18 emitted from openings 22 is deflected by exhaust deflector 50 into plenum chamber 49 where it passes out openings 56 in truck bed floor 39 into the passages 59 along the sides of the truck. The exhaust then passes into the cross sills 38 through openings 62 and into the tubular box section side members 40 through openings 64. The hot exhaust gases further flow along the top side rails 42 through openings 66, exiting at outlet 68 underneath downwardly folded channels 74, and then the exhaust is directed down into the body of the truck. The metal roll cover 70 is used to close the top of the truck to retain the heat in the truck body. Additional exhaust from the passages 59 passes rearwardly into the tailgate to heat the tailgate and exit through exhaust openings 104. The area for the exhaust passages throughout the heated body is such that it will not provide a restriction for the exhaust or create any back pressure on the engine exhaust more than a regular muffler. The truck body is made from aluminum extrusions which are easy to build and are made in sections which may be knocked down and assembled at an assembly site. Utilizing the present construction, this truck body can be built in one-third the time as ordinary truck bodies.

The tubular box section carries weight like a bridge truss on the sides of the truck. Furthermore, the truck bed is so well supported it will not become distorted or warped and will retain its shape for a number of years, while the conventional truck bodies sway and become depressed on extensive loading.

The pivoted tailgate provided by hinge 90 allows the truck to be used and not jam into obstacles or break a tailgate when such jamming does inadvertently occur. The tailgate locking device uses an unsupported hook for easy unlocking of the tailgate.

With the heated aluminum truck body of the present invention, highway hauling of hot mix bituminous paving materials may be accomplished since the materials will be maintained hot by the exhaust gas flow through the structural passages and contained by the metal roll cover while preventing any hot or cold spots. Furthermore, the truck body is self-cleaning.

If desired to maintain exhaust flow through the truck body passages when dumping, see FIGURE 6, a short flexible line can connect exhaust outlet 22a and the corresponding inlet on the truck body. The other inlets are then provided with check valves.

While the invention has been particularly shown and described with reference to preferred embodiments thereof, it will be understood by those skilled in the art that the foregoing and other changes in form and details may be made therein without departing from the spirit and scope of the invention.

I claim:

1. A dump truck body having a bed, side walls, front walls and a tailgate and heated by circulating engine exhaust, means for pivoting the truck body on a vehicle the body comprising; tubular structural members extending along the top of the side walls, tubular structural members extending upwardly along the side walls and connected to the top structural members and defining fluid passages, tubular structural members extending transversely under the bed of the truck, means defining exhaust entrance plenum chambers under the bed of the truck, means defining longitudinally extending exhaust passages along the lower side edges of the truck in fluid communication with the plenum chambers, openings connecting the longitudinal passages along the lower side edges of the truck with the transverse hollow structural tubular members under the bottom of the truck and the tubular structural members extending upwardly along the sides of the truck, means defining exhaust passages in the tailgate in communication with the longitudinally extending exhaust passages, said means including at least some tubular structural members, exhaust outlet openings in at least some of the tubular structural members of the tailgate and along the top of the side walls, and a rollable metal cover mounted at the top front of said body extendable to cover the top of the heated truck body.

2. A heated dump truck body as in claim 1 wherein the body and tubular structural members are constructed of aluminum.

3. A heated dump truck body as in claim 1 wherein the means defining the plenum chamber includes a skirted opening for cooperating with tapered exhaust openings of exhaust pipes carried by a truck bed.

4. A heated truck body as in claim 1 in which the tailgate is provided at a horizontal plane intermediate the top and bottom of the tailgate.

5. A heated truck body as in claim 4 wherein the tailgate includes inwardly extending deflectors adjacent the inner sides of the truck body.

6. A dump truck body as in claim 1 further comprising a tailgate latch with a freely falling hook, the hook pivoted to a lever and supported in locking position by the bottom of an opening in the rear side member of the truck body.

7. A dump truck body as in claim 1 wherein edges of the metal roll cover are guided by channels pivoted longitudinally to the upper edge of the truck sides, the channels being pivotable to a vertical position to form an upward continuation of the truck sides.

8. A dump truck body as in claim 1 wherein the rollable metal cover is operated by cables extending from the cover over pulleys to an operating mechanism.

9. A dump truck as in claim 8 wherein the operating mechanism includes drums with spiral take-up grooves for the cables, the spiral grooves corresponding to the wound up roll cover.

References Cited

UNITED STATES PATENTS

| 2,594,910 | 4/1952 | Germann | 296—98 |
| 2,974,997 | 3/1961 | Parsley | 296—28 |
| 3,331,433 | 7/1967 | Hagberg. | |
| 3,363,933 | 1/1968 | Wilson | 296—28 |

FOREIGN PATENTS 735,205   8/1955   Great Britain.

RICHARD J. JOHNSON, Primary Examiner

U.S. Cl. X.R.

296—56, 98; 298—1, 23